(12) United States Patent
Lim et al.

(10) Patent No.: US 11,612,536 B2
(45) Date of Patent: Mar. 28, 2023

(54) WEARABLE APPARATUS FOR ASSISTING MUSCULAR STRENGTH AND A METHOD FOR CONTROLLING THE SAME

(71) Applicants: HYUNDAI MOTOR COMPANY, Seoul (KR); KIA MOTORS CORPORATION, Seoul (KR)

(72) Inventors: Hyun Seop Lim, Anyang-si (KR); Sang In Park, Suwon-si (KR); Dong Jin Hyun, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 544 days.

(21) Appl. No.: 16/692,174

(22) Filed: Nov. 22, 2019

(65) Prior Publication Data
US 2020/0390635 A1 Dec. 17, 2020

(30) Foreign Application Priority Data
Jun. 11, 2019 (KR) .......................... 10-2019-0068351

(51) Int. Cl.
*A61H 3/00* (2006.01)
*B25J 9/00* (2006.01)

(52) U.S. Cl.
CPC .............. *A61H 3/00* (2013.01); *B25J 9/0006* (2013.01); *A61H 2003/007* (2013.01); *A61H 2201/1215* (2013.01); *A61H 2201/1642* (2013.01); *A61H 2205/081* (2013.01); *A61H 2205/108* (2013.01)

(58) Field of Classification Search
CPC ................ A61H 3/00; A61H 2003/007; A61H 2201/1215; A61H 2201/1642; A61H 2205/081; A61H 2205/108; B25J 9/0006
See application file for complete search history.

(56) References Cited

U.S. PATENT DOCUMENTS

| | | | |
|---|---|---|---|
| 2011/0164949 A1* | 7/2011 | Kim ...................... | B25J 9/0006 414/1 |
| 2012/0310412 A1* | 12/2012 | Seo ........................ | G06N 3/008 700/254 |
| 2013/0226048 A1* | 8/2013 | Unluhisarcikli ..... | A61H 1/0244 601/34 |

(Continued)

FOREIGN PATENT DOCUMENTS

KR 101219795 B1 1/2013

*Primary Examiner* — Jerrah Edwards
*Assistant Examiner* — Aren Patel
(74) *Attorney, Agent, or Firm* — Lempia Summerfield Katz LLC (57) ABSTRACT

A wearable apparatus and a method assist and control muscular strength. The wearable apparatus includes a support unit located on the rear surface of a wearer. An actuator is fixed to the support unit and a sliding unit is slidably connected to the actuator and is slidable with respect to the support unit due to driving of the actuator. First and second rotating units are connected to the support unit to be located at both sides of the wearer such that one end of each of the first and second rotating units is coupled to the support unit so as to be rotatable forwards and backwards with respect to the support unit. A power transmission unit is provided with respective ends coupled to the first and second rotating units via the sliding unit and configured to generate rotary force of the first and second rotating units.

18 Claims, 9 Drawing Sheets

(56) References Cited

U.S. PATENT DOCUMENTS

| | | | |
|---|---|---|---|
| 2017/0119613 A1* | 5/2017 | Roh | A61H 1/0237 |
| 2017/0143517 A1* | 5/2017 | Sankai | A61B 5/11 |
| 2018/0161188 A1* | 6/2018 | Zistatsis | A61H 1/024 |
| 2018/0177670 A1* | 6/2018 | Shim | B25J 9/0006 |
| 2018/0280178 A1* | 10/2018 | Shimada | B25J 9/1045 |
| 2019/0183713 A1* | 6/2019 | Sankai | A61B 5/4058 |

\* cited by examiner

WEARABLE APPARATUS FOR ASSISTING MUSCULAR STRENGTH AND A METHOD FOR CONTROLLING THE SAME

CROSS-REFERENCE TO RELATED APPLICATION

This application claims priority to and the benefit of Korean Patent Application No. 10-2019-0068351, filed on Jun. 11, 2019 in the Korean Intellectual Property Office, the disclosure of which is incorporated herein by reference.

BACKGROUND

1. Field of the Disclosure

The present disclosure relates to a wearable apparatus for assisting muscular strength and a method for controlling the same, and more particularly to an apparatus which assists waist muscular strength of a wearer.

2. Description of the Related Art

In various industrial settings or in our daily lives, there may arise situations that require physical ability exceeding the physical limits of humans. In such cases, work efficiency is lowered and there is the risk of physical injury to a worker.

In order to solve these problems, a wearable robot which is worn directly by a worker and assists the movement of the worker has been developed. In this case, when the worker wears the robot, the robot drives respective joints of the worker by bearing the loads applied to the joints.

Up to now, most wearable robots are operated in a manner that individually drives respective joints. In such a structure, the respective joints individually require actuators and reducers, thus causing problems including a limit in reducing the weight of the wearable robots, instability in simultaneous control of the actuators, and rise in costs.

Accordingly, a wearable robot which assists the waist muscular strength of a wearer through one actuator and one reducer has been developed. However, this waist-muscular-strength-assisting wearable robot needs to be controlled to assist the waist muscular strength of the wearer when the wearer bends or stretches his/her back and to avoid causing inconvenience when the wearer walks.

The above description has been provided to aid in understanding of the background of the present disclosure and should not be interpreted as conventional technology known to those having ordinary skill in the art.

SUMMARY

Therefore, the present disclosure is made in view of the above problems. It is an object of the present disclosure to provide a wearable apparatus for assisting muscular strength, which may assist muscular strength of a wearer using one actuator without interfering with wearer as they walk.

In accordance with an aspect of the present disclosure, the above and other objects can be accomplished by the provision of a wearable apparatus for assisting muscular strength. The wearable apparatus includes: a support unit located on a rear surface of a wearer; an actuator located on the support unit to be fixed thereto; a sliding unit slidably connected to the actuator; a first rotating unit and a second rotating unit; and a power transmission unit. The sliding unit is slidable with respect to the support unit due to driving of the actuator. The first rotating unit and the second rotating unit are connected to the support unit to be located at both sides of the wearer such that one end of each of the first and second rotating units is coupled to the support unit to be rotatable forwards and backwards with respect to the support unit. The power transmission unit is provided with respective ends that are coupled to the first rotating unit and the second rotating unit via the sliding unit and is configured to generate rotary force of the first rotating unit and the second rotating unit due to sliding of the sliding unit.

The power transmission unit may include a first wire provided with respective ends coupled to the first rotating unit and the second rotating unit to rotate the first rotating unit and the second rotating unit forwards when tension is applied thereto. The power transmission unit may further include a second wire provided with respective ends coupled to the first rotating unit and the second rotating unit to rotate the first rotating unit and the second rotating unit backwards when tension is applied thereto.

The ends of the first wire may be coupled to front parts of the first rotating unit and the second rotating unit. The ends of the second wire may be coupled to rear parts of the first rotating unit and the second rotating unit.

Elastic bodies located between the respective ends of the power transmission unit and each of the first rotating unit and the second rotating unit and deformed by tension transmitted by the power transmission unit may be provided on the power transmission unit.

The power transmission unit may extend to both ends of the wearable apparatus in a state in which the power transmission unit is wound on one side of the support unit and the sliding unit. The transmission unit is spaced sideways apart from the sliding unit.

A first stationary pulley may be provided at the one side of the support unit, spaced sideways apart from the sliding unit. A first movable pulley may be provided at the sliding unit. The power transmission unit may be wound on the first stationary pulley and the first movable pulley between the respective ends of the power transmission unit.

The power transmission unit may include a first wire and a second wire. The first wire may be wound on the first stationary pulley and the first movable pulley between respective ends of the first wire. The second wire may be wound on a second stationary pulley rotatably coupled to the other side of the support unit, spaced sideways apart from the sliding unit. A second movable pulley may be rotatably coupled to the sliding unit.

The wearable apparatus for assisting muscular strength may further include a first fixing unit and a second fixing unit, each of which is provided with one end coupled to each of both sides of the support unit and the other end rotatably coupled to each of the first rotating unit and the second rotating unit.

The one end of each of the first fixing unit and the second fixing unit may be coupled to the support unit to be slidable sideways.

A first connection pulley rotatably coupled to each of the first fixing unit and the second fixing unit may be provided at one end of each of the first fixing unit and the second fixing unit. A second connection pulley rotatably coupled to the support unit may be provided at a position of the support unit spaced outwards from the first connection pulley. The power transmission unit may be wound on the first connection pulley and the second connection pulley between the respective ends of the power transmission unit.

One end of each of the first fixing unit and the second fixing unit may be slidable with respect to the support unit in a state in which the one end is inserted into the support unit. A rotary shaft of the second connection pulley passes each of the first fixing unit and the second fixing unit. The rotary shaft may be coupled to the support unit. A sliding groove, through which a rotary shaft of the second connection pulley passes so as to be slidable, may be formed in each of the first fixing unit and the second fixing unit.

A binder configured to couple each of the first rotating unit and the second rotating unit to a thigh of the wearer may be provided on each of the first rotating unit and the second rotating unit so as to transmit rotational force of each of the first rotating unit and the second rotating unit to the thigh of the wearer.

In accordance with another aspect of the present disclosure, a method for controlling the wearable apparatus for assisting muscular strength is provided. The method includes calculating a torque demanded by the first rotating unit and the second rotating unit, and controlling the actuator based on the calculated torque and a force transmitted by the power transmission unit.

In the calculating the demanded torque, the demanded torque may be calculated as a sum of a gravity compensation torque configured to compensate for gravity due to bending of a torso of the wearer, a virtual elastic torque configured to be applied to a virtual spring due to bending of thighs of the wearer, a torso assisting torque configured to assist a torso extension action of the wearer, and a thigh assisting torque configured to assist a thigh extension action of the wearer.

The gravity compensation torque may be calculated based on an angle of bending of the torso of the wearer. If the angle of bending of the torso of the wearer has a negative value, the angle of bending of the torso of the wearer may be multiplied by a predetermined gain value.

The virtual elastic torque may be calculated based on an angle of bending of the thighs of the wearer and a predetermined virtual spring constant.

Each of the torso assisting torque and the thigh assisting torque may be calculated based on a corresponding of an angular speed of a corresponding one of the torso extension action and the thigh extension action of the wearer.

Each of the torso assisting torque and the thigh assisting torque may be calculated such that a magnitude thereof is decreased, as a corresponding one of the angle of bending of the torso of the wearer and the angle of bending of the thighs of the wearer is decreased, as long as the corresponding one of the angle of bending of the torso of the wearer and the angle of bending of the thighs of the wearer is a predetermined angle or less.

Elastic bodies located between the respective ends of the power transmission unit and each of the first rotating unit and the second rotating unit and deformed by tension transmitted by the power transmission unit may be provided on the power transmission unit. In the controlling the actuator, the force transmitted by the power transmission unit may be estimated based on deformation of the elastic bodies.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

Specific structural or functional descriptions of embodiments of the present disclosure set forth in the description which follows are examples given to describe the embodiments of the present disclosure. However, the present disclosure may be embodied in many alternative forms and should not be construed as being limited to the embodiments set forth herein.

The embodiments of the present disclosure may be variously modified and changed. Thus, specific embodiments of the present disclosure are illustrated in the drawings and described in detail in the following description of the embodiments of the present disclosure. However, the embodiments of the present disclosure are provided only to divulge the disclosure and to inform those having ordinary skill in the art of the scope of the disclosure.

In the following description of the embodiments, it should be understood that, when the terms "first", "second", etc. are used to describe various elements, these terms are not used to limit the elements. In other words, these terms are used merely to distinguish the same or similar elements. Therefore, a first element may be named a second element and similarly a second element may be named a first element, within the technical scope of the disclosure, unless stated otherwise.

In the following description of the embodiments, it should be understood that, when an element is "connected to", "coupled to", etc. another element, the two elements may be directly connected or coupled, or one or more other elements may be interposed between the two elements. On the other hand, it should be understood that, when an element is "directly connected to", "directly coupled to", and the like to another element, no elements may be interposed between the two elements. In the following description of the embodiments, other terms expressing relations between elements, such as "between" and "directly between" or "adjacent to" and "directly adjacent to", should be interpreted in the same manner.

It should be understood that terms used in the following description of the embodiments are used only to describe specific embodiments and are not intended to limit the disclosure. A singular expression of an element encompasses a plural expression of the element, unless stated otherwise. In the following description of the embodiments, terms "including", "having", and the like, should be interpreted as indicating presence of characteristics, numbers, steps, operations, elements or parts stated in the specification or combinations thereof, and do not exclude presence of one or more characteristics, numbers, steps, operations, elements, parts or combinations thereof, or a possibility of adding the same.

It should be understood that all terms, including technical or scientific terms, used in the following description of the embodiments have the same meanings as those which are generally understood by those having ordinary skill in the art, unless defined otherwise. Also, it should be interpreted that terms defined in generally used dictionaries have meanings coinciding with contextual meanings in the related art, and do not have ideal or excessively formal meanings unless clearly defined.

Hereinafter, reference is made in detail to various embodiments of the present disclosure, examples of which are illustrated in the accompanying drawings. In the following description of the embodiments and the drawings, the same or similar elements are denoted by the same reference numerals even when they are depicted in different drawings.

Figure 1:
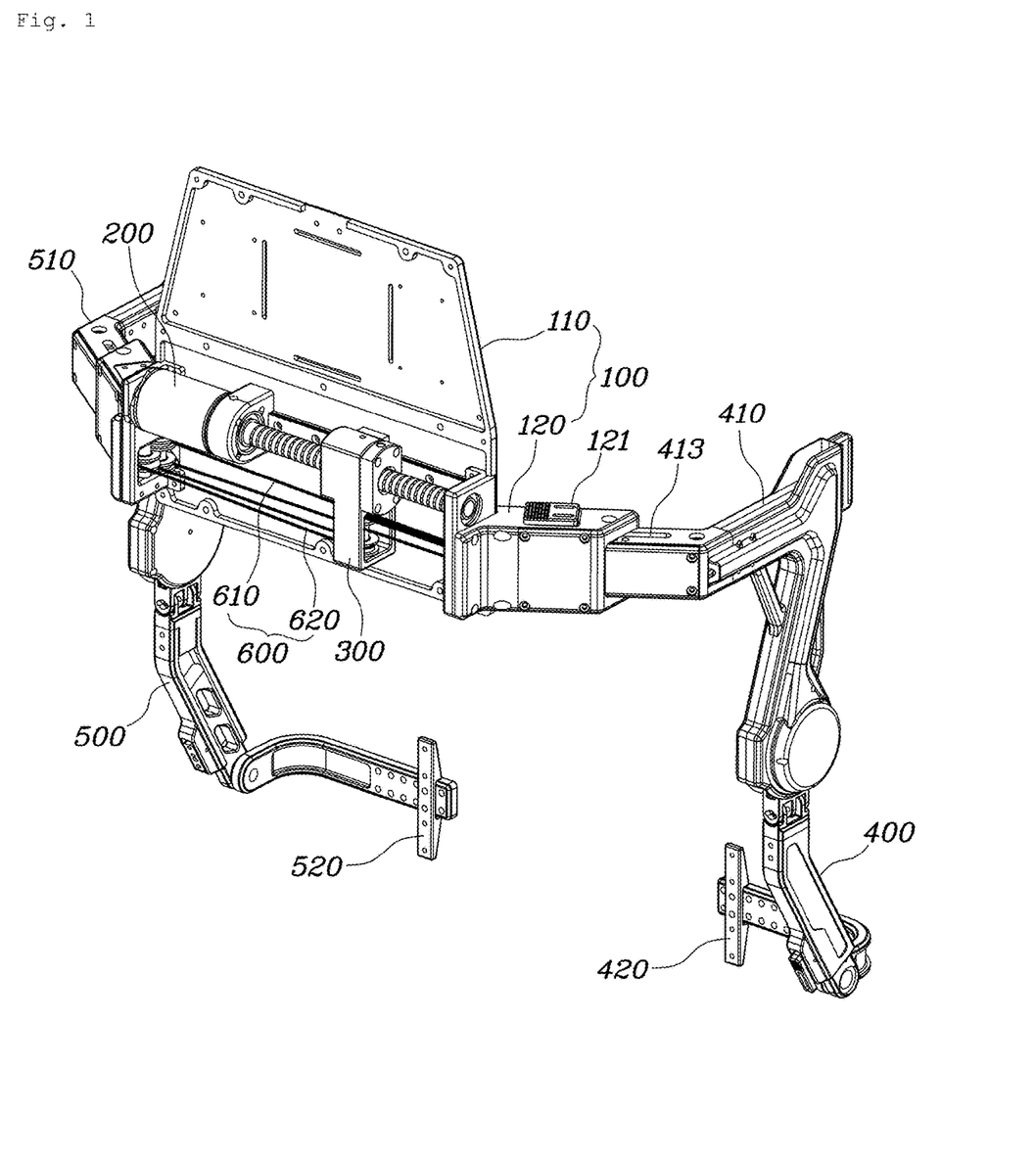
FIG. 1 is a rear perspective view of a wearable apparatus for assisting muscular strength in accordance with one embodiment of the present disclosure.
Figure 2:
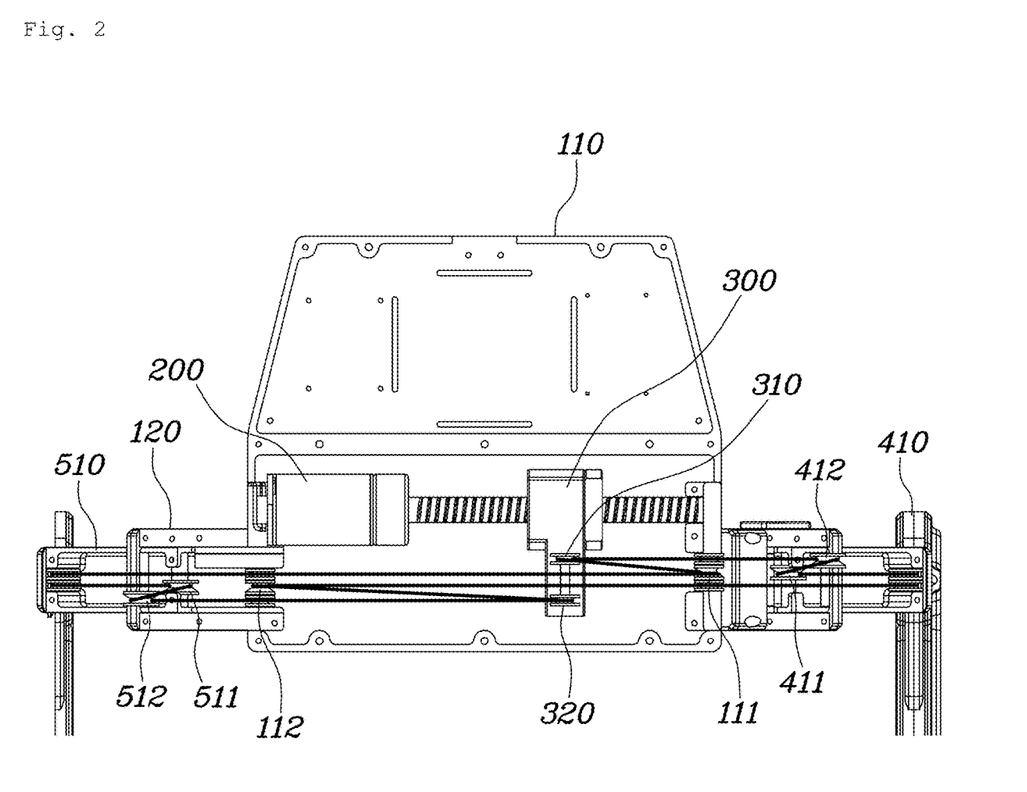
FIG. 2 is a rear view of the wearable apparatus for assisting muscular strength in accordance with one embodiment of the present disclosure.
Figure 3:
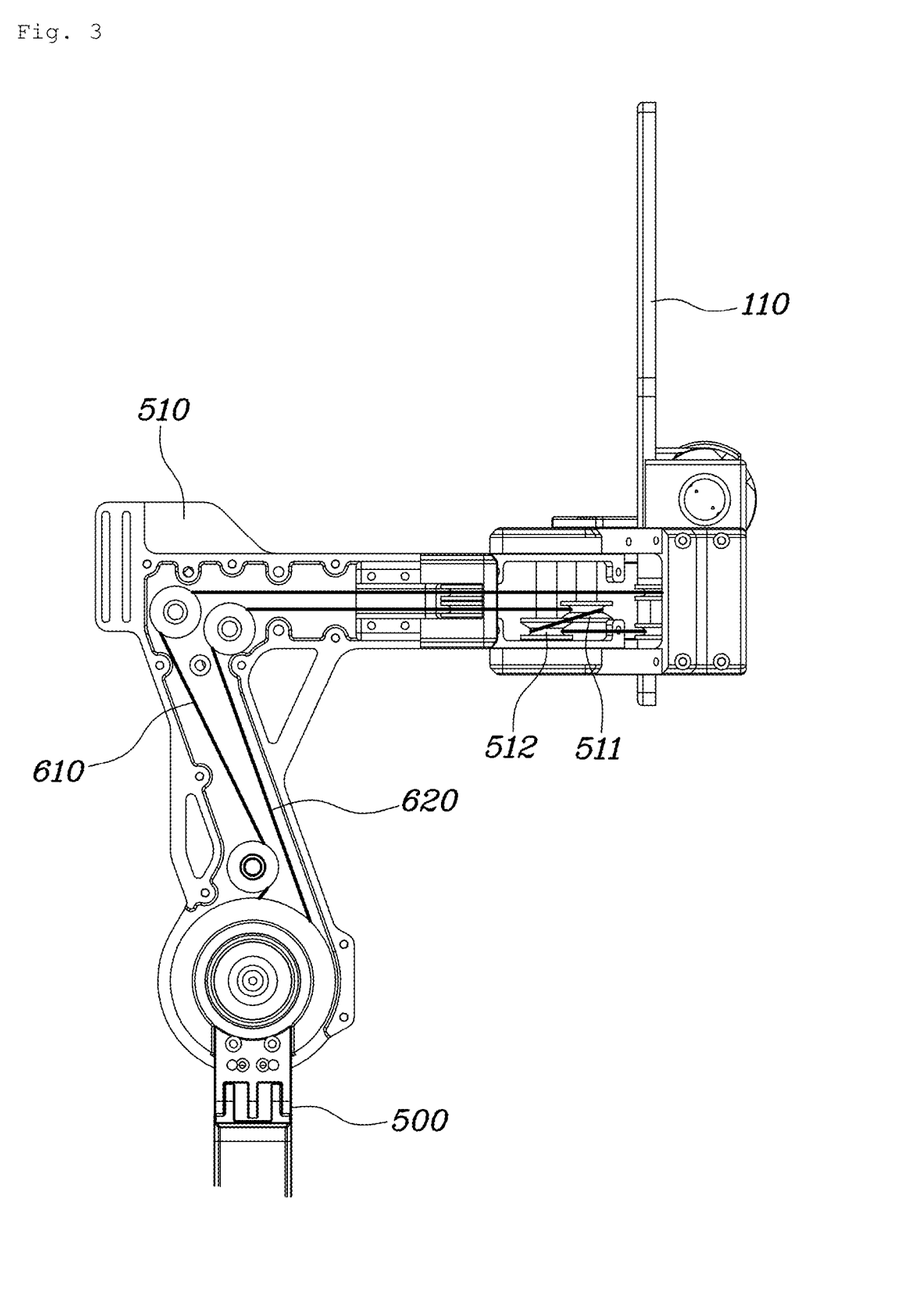
FIG. 3 is a side view of the wearable apparatus for assisting muscular strength in accordance with one embodiment of the present disclosure.
Figure 4:
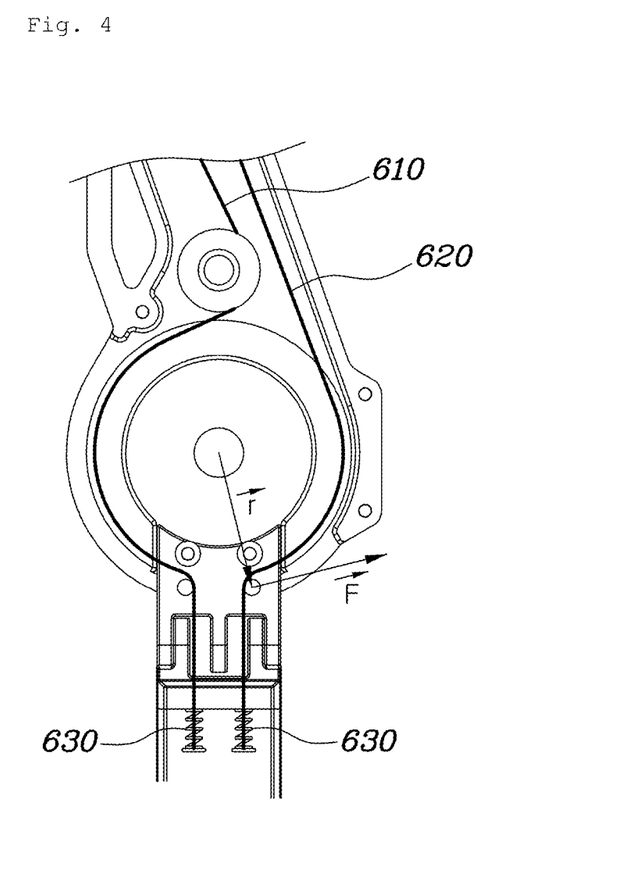
FIG. 4 is an enlarged side view of the wearable apparatus for assisting muscular strength in accordance with one embodiment of the present disclosure.

FIG. 1 is a rear perspective view of a wearable apparatus for assisting muscular strength in accordance with one embodiment of the present disclosure. FIG. 2 is a rear view of the wearable apparatus for assisting muscular strength in accordance with one embodiment of the present disclosure. FIG. 3 is a side view of the wearable apparatus for assisting muscular strength in accordance with one embodiment of the present disclosure. FIG. 4 is an enlarged side view of the wearable apparatus for assisting muscular strength in accordance with one embodiment of the present disclosure.

Referring to FIGS. 1-4, a wearable apparatus for assisting muscular strength in accordance with one embodiment of the present disclosure includes a support unit 100 located on the rear surface of a wearer. An actuator 200 is located on the support unit 100 to be fixed thereto and driven to generate rotary force. A sliding unit 300 is slidably coupled to the actuator 200 and can slide with respect to the support unit 100 due to driving of the actuator 200. A first rotating unit 400 and a second rotating unit 500 are connected to the support unit 100 to be located at both sides of the wearer such that one end of each of the first and second rotating units 400 and 500 is coupled to the support unit 100 so as to be rotatable forwards and backwards with respect to the support unit 100. A power transmission unit 600 is provided with respective ends coupled to the first rotating unit 400 and the second rotating unit 500 via the sliding unit 300. The power transmission unit 600 generates rotary force of the first rotating unit 400 and the second rotating unit 500 due to sliding of the sliding unit 300.

The support unit 100 is located at the back or the waist on the rear surface of the wearer and supported by the torso of the wearer. The support unit 100 may be coupled to the front part of the wearer by a separate harness.

The support unit 100 may include a rear surface support 110, which directly contacts the rear surface of the wearer. The support unit 100 may further include insertion parts 120, which extend from both sides of the rear surface support 110. Particularly, the insertion parts 120 may extend sideways and be inclined forwards. As described below, a first fixing unit 410 and a second fixing unit 510 are inserted into the insertion parts 120 so that they may be slidably coupled to each other.

The actuator 200 may be fixed to the support unit 100. The actuator 200 may be a rotating motor which generates rotary force by receiving electric power. The actuator 200 may be coupled via a rack-and-pinion configuration and thus convert rotational motion into rectilinear motion. In addition, a battery (not shown), which supplies electric power to a motor, and a controller (not shown), which controls the actuator 200, may be fixed to the support unit 100.

Further, the actuator 200 may be a power device which directly generates rectilinear motion, such as a linear motor, a hydraulic actuator, etc.

The sliding unit 300 may be slidably coupled to the actuator 200. Particularly, the sliding unit 300 is slid rectilinearly by driving the actuator 200. The sliding unit 300 may thus be slid with respect to the support unit 100 to which the actuator 200 is fixed. Particularly, the sliding unit 300 may be fastened to a rotary shaft of the motor in a ball-screw manner and be rectilinearly moved by rotation of the rotary shaft.

The first rotating unit 400 and the second rotating unit 500 may be connected to the support unit 100 at both sides of the wearer. Particularly, the first rotating unit 400 and the second rotating unit 500 may be coupled to the support unit 100 such that, with respect to one end of each of the first and second rotating units 400 and 500 fixed to the support unit 100, the other end of the corresponding rotating unit 400 or 500 is rotatable forwards or backwards. Particularly, the first rotating unit 400 and the second rotating unit 500 may be supported by the thighs of the wearer.

The respective ends of the power transmission unit 600 may be coupled to the first rotating unit 400 and the second rotating unit 500 via the sliding unit 300. Further, the power transmission unit 600 may generate tension by sliding of the sliding unit 300, and thereby generate rotary force of the first rotating unit 400 and the second rotating unit 500 coupled to respective ends of the power transmission unit 600.

Particularly, the ends of the power transmission unit 600 at positions which are spaced apart from the centers of rotations of one ends of the first rotating unit 400 and the second rotating unit 500 with respect to the support unit 100 transmit tension acting on the first rotating unit 400 and the second rotating unit 500 to the first rotating unit 400 and the second rotating unit 500, thus being capable of generating rotary force.

Therefore, the wearable apparatus may drive the posture of the wearer using only one actuator 200. Thus, the cost of manufacturing the wearable apparatus may be reduced. Additionally, the power transmission unit 600 may interlock rotations of the first rotating unit 400 and the second rotating unit 500 with each other to avoid interfering with the walking of the wearer.

The power transmission unit 600 may include a first wire 610 provided with respective ends coupled to the first rotating unit 400 and the second rotating unit 500 so as to rotate the first rotating unit 400 and the second rotating unit 500 forwards when tension is applied thereto. The power transmission unit 600 may further include a second wire 620 provided with respective ends coupled to the first rotating unit 400 and the second rotating unit 500 so as to rotate the first rotating unit 400 and the second rotating unit 500 backwards when tension is applied thereto.

The first rotating unit 400 and the second rotating unit 500, each of which is provided with one end coupled to the support unit 100 so as to be rotated forwards or backwards, may include both the first wire 610 and the second wire 620 to apply rotary force forwards and backwards.

Therefore, the first wire 610 or the second wire 620 may be tensioned by the driving of the actuator 200, thus being capable of performing a motion of rotating the first rotating unit 400 and the second rotating unit 500 forwards or backwards.

In another example, the power transmission unit 600 may include the second wire 620 alone so as to assist only an action of stretching the waist of the wearer, i.e., an extension. Therefore, the second wire 620 may be tensioned, and thus the first rotating unit 400 and the second rotating unit 500 may be rotated backwards and thereby support the thighs of the wearer.

In more detail, ends of the first wire 610 may be coupled to the front parts of the first rotating unit 400 and the second rotating unit 500. Ends of the second wire 620 may be coupled to the rear parts of the first rotating unit 400 and the second rotating unit 500.

The ends of the first wire 610 may be coupled to positions of the first rotating unit 400 and the second rotating unit 500 located in front of the centers of rotation, each of which is located at a corresponding one of the ends of the first rotating unit 400 and the second rotating unit 500, and may thus rotate the first rotating unit 400 and the second rotating unit 500 forwards when tension is applied thereto. In contrast, the ends of the second wire 620 may be coupled to positions of the first rotating unit 400 and the second rotating unit 500 located at the rear of the centers of rotation, each of which is located at the corresponding one of the ends of the first rotating unit 400 and the second rotating unit 500, and may thus rotate the first rotating unit 400 the second rotating unit 500 backwards when tension is applied thereto.

Elastic bodies 630 (shown in FIG. 4), which are respectively located between the respective ends of the power transmission unit 600 and the first and second rotating units 400 and 500 and are deformed by tension transmitted by the power transmission unit 600, may be provided on the power transmission unit 600.

The respective ends of the first wire 610 and the second wire 620 may be coupled to the first rotating unit 400 and the second rotating unit 500 via the elastic bodies 630, such as springs. Therefore, the elastic bodies 630 may be deformed by tension acting on the first wire 610 and the second wire 620. Particularly, the elastic bodies 630 may be springs deformed in a length direction in which the first wire 610 and the second wire 620 extend.

Therefore, a magnitude of tension acting on the first wire 610 and the second wire 620 may be estimated by measuring the deformation of the elastic bodies 630.

The power transmission unit 600 may extend to both ends of the wearable apparatus when the power transmission unit 600 is wound on one side of the support unit 100 and the sliding unit 300 The support unit 100 is spaced sideways apart from the sliding unit 300.

In detail, the power transmission unit 600 is wound on one side of the support unit 100 and the sliding unit 300 between the respective ends of the power transmission unit 600 coupled to the first rotating unit 400 and the second rotating unit 500. The length of the power transmission unit 600 may be varied according to change in a distance from the sliding unit 300 and one side of the supporting unit 100. Therefore, as the sliding unit 300 is slid, the distance of the sliding unit 300 from one side of the support unit 100 is varied. Thus, the length of the power transmission unit 600 may be varied.

More specifically, a first stationary pulley 111 (shown in FIG. 5A) may be provided at one side of the support unit 100 spaced sideways apart from the sliding unit 300. A first movable pulley 310 may be provided at the sliding unit 300. The power transmission unit 600 may be wound on the first stationary pulley 111 and the first movable pulley 310 between the respective ends of the power transmission unit 600. The first stationary pulley 111 and the first movable pulley 310 may be coupled to the support unit 100 and the sliding unit 300 so as to be autonomously rotatable.

Figure 5A:
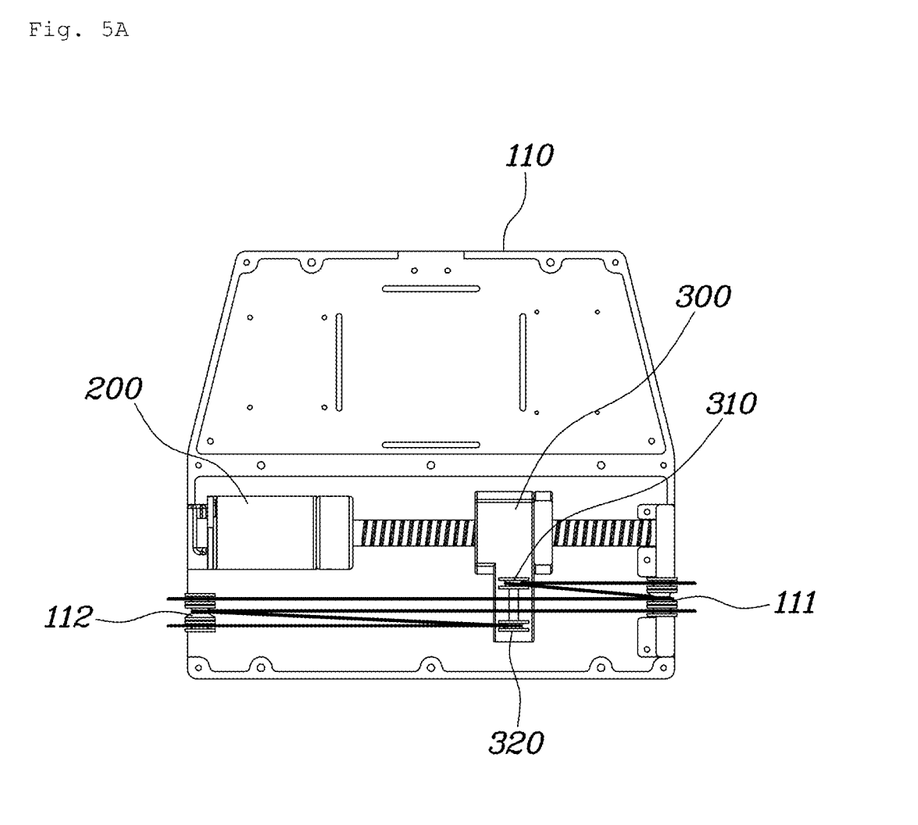
FIG. 5A-5C are rear views illustrating an operating state of the wearable apparatus for assisting muscular strength in accordance with one embodiment of the present disclosure.

Particularly, the power transmission unit 600 may include the first wire 610 and the second wire 620. The first wire 610 may be wound on the first stationary pulley 111 and the first movable pulley 310 between the respective ends of the first wire 610. The second wire 620 may be wound on a second stationary pulley 112 rotatably coupled to the other side of the support unit 100 at a position spaced sideways apart from the sliding unit 300 and a second movable pulley 320 rotatably coupled to the sliding unit 300.

In other words, when one end of the first wire 610 is coupled to the first rotating unit 400, the first wire 610 may: extend toward the support unit 100; pass through the one side of the support unit 100; extend toward the other side of the support unit 100; be wound on the first movable pulley 310 of the sliding unit 30; extend again toward the one side of the support unit 100; be wound on the first stationary pulley 111 at one side of the support unit 100; extend again toward the other side of the support unit 100; and extend again toward the other side of the support unit 100 so that the other end of the first wire 610 may be coupled to the second rotating unit 500.

When one end of the second wire 620 is coupled to the first rotating unit 400, the second wire 620 may: extend toward the support unit 100; pass through the one side of the support unit 100; be wound on the second stationary pulley 112 at the other side of the support unit 100; extend again toward the one side of the supporting unit 100; be wound on the second movable pulley 320 of the sliding unit 300; and extend again toward the other side of the supporting unit 100 so that the other end of the second wire 620 may be coupled to the second rotating unit 500.

Figure 5B:
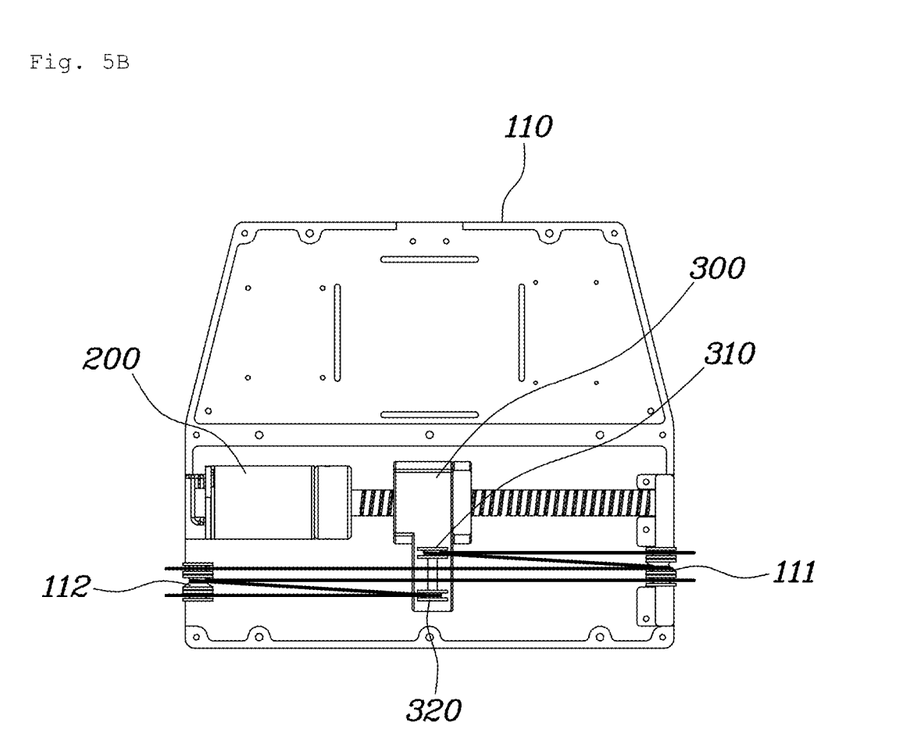
Figure 5C:
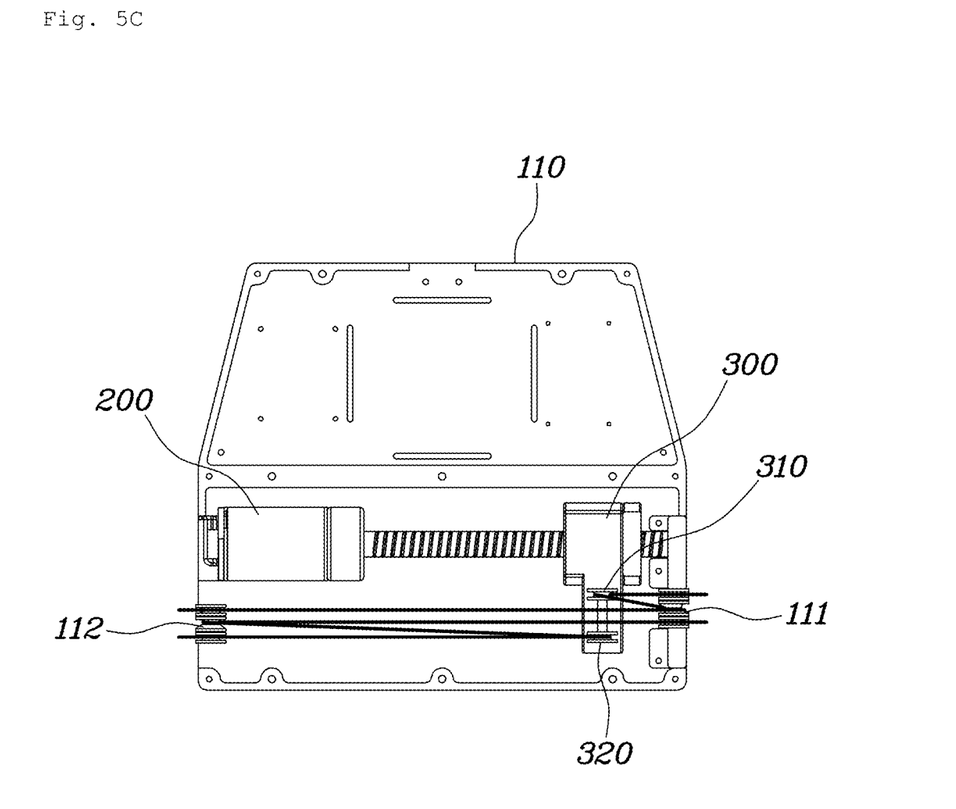

FIGS. 5A-5C are rear views that illustrate an operating state of the wearable apparatus for assisting muscular strength in accordance with one embodiment of the present disclosure.

Referring to FIGS. 5A-5C, the sliding unit 300 may be slid sideways by driving of the actuator 200. Particularly, the sliding unit 300 may vary the lengths of the first wire 610 and the second wire 620.

As shown in FIGS. 5A and 5B, when the sliding unit 300 is moved leftwards, tension that stretches the first wire 610 is generated. In other words, as a distance between the first stationary pulley 111 and the first movable pulley 310 on which the first wire 610 is wound is increased, tension is generated in the first wire 610 and thus rotates the first rotating unit 400 and the second rotating unit 500 forwards, thus enabling the wearer to perform an action of bending his/her waist, i.e., a flexion.

On the other hand, as shown in FIGS. 5A and 5C, when the sliding unit 300 is moved rightwards, tension that stretches the second wire 620 is generated. In other words, as a distance between the second stationary pulley 112 and the second movable pulley 320 on which the second wire 620 is wound is increased, tension is generated in the second wire 620 and thus rotates the first rotating unit 400 and the second rotating unit 500 backwards, thus enabling the wear to perform an action of stretching his/her waist, i.e., an extension.

Further, the first wire 610 and the second wire 620, the respective ends of which are connected to the first rotating unit 400 and the second rotating unit 500, may be moved without movement of the sliding unit 300 and allow movement of the first rotating unit 400 and the second rotating unit 500 in opposite directions. Thereby, the wearer can walk freely without driving the actuator 200 and moving the sliding unit 300.

Figure 6:
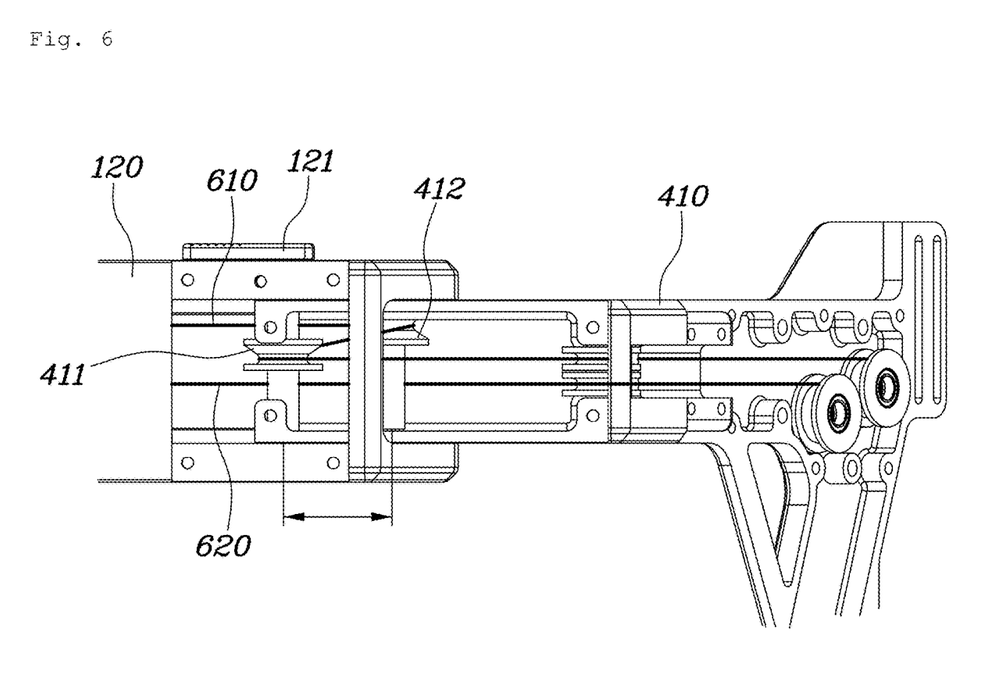
FIG. 6 is an enlarged side perspective view of the wearable apparatus for assisting muscular strength in accordance with one embodiment of the present disclosure.

FIG. 6 is an enlarged side perspective view of the wearable apparatus for assisting muscular strength in accordance with one embodiment of the present disclosure.

Referring to FIG. 6, the wearable apparatus for assisting muscular strength further includes the first fixing unit 410 and the second fixing unit 510, each of which is provided with one end coupled to each of both sides of the support unit 100 and the other end rotatably coupled to each of the first rotating unit 400 and the second rotating unit 500.

The first fixing unit 410 and the second fixing unit 510 may extend downwards from the support unit 100 and connect the first rotating unit 400 and the second rotating unit 500 to the support unit 100.

Particularly, one end of each of the first fixing unit 410 and the second fixing unit 510 may be coupled to the support unit 100 to be slidable sideways.

The first fixing unit 410 and the second fixing unit 510 are slidable within the insertion parts 120 provided at both sides of the support unit 100. Particularly, the first fixing unit 410 and the second fixing unit 510 may be slidable in a state in which they are inserted into the insertion parts 120. A switch 121 may be provided at the insertion part 120 to interrupt sliding of the first fixing unit 410 or the second fixing unit 510 with respect to the insertion part 120.

In accordance with one embodiment, the insertion parts 120 may extend in the sideways direction of the wearer. In accordance with another embodiment, the insertion parts 120 may extend in the sideways direction of the wearer and be then inclined forwards.

One end of each of the first fixing unit 410 and the second fixing unit 510 extends parallel to the insertion part 120 and is slid with respect to the insertion part 120.

Thus, the first fixing unit 410 and the second fixing unit 510 may be slid sideways or slid at an angle of inclination in the forward direction from the sides of the wearer.

Therefore, a sideways separation distance may be adjusted by simple manipulation of the switches 121 so that the wearable apparatus is pressed against the body of the wearer.

A first connection pulley 411 or 511 rotatably coupled to the first fixing unit 410 or the second fixing unit 510 may be provided at one end of the first fixing unit 410 or the second fixing unit 510. A second connection pulley 412 or 512 rotatably coupled to the support unit 100 may be provided at a position of the support unit 100 spaced outwards from the first connection pulley 411 or 511. The power transmission unit 600 may be wound on the first connection pulleys 411 and 511 and the second connection pulleys 412 and 512 between respective ends of the power transmission unit 600.

When the first fixing unit 410 and the second fixing unit 510 are slid sideways, the distance between the first rotating unit 400 and the second rotating unit 500 is varied. Thus, the lengths of the first wire 610 and the second wire 620 are increased or decreased and the magnitude of tension applied thereto is varied. In order to compensate for such tension variation, the lengths of the first wire 610 and the second wire 620 may be varied depending on sideways sliding of the first fixing unit 410 and the second fixing unit 510.

For example, when the first fixing unit 410 and the second fixing unit 510 are moved outwards by the same length x, the lengths of the first wire 610 and the second wire 620 are increased by double the movement length x of the first fixing unit 410 and the second fixing unit 510. In order to compensate for this, when a distance L between the first connection pulleys 411 and 511 and the second connection pulleys 412 and 512 is decreased by the same length x, the lengths of the first wire 610 and the second wire 620 are decreased by double the movement length x of the first fixing unit 410 and the second fixing unit 510. Thus, the lengths of the first wire 610 and the second wire 620 may remain the same.

Particularly, the first connection pulleys 411 and 511 may be rotatably coupled to fixed positions of the first fixing unit 410 and the second fixing unit 510. The second connection pulleys 412 and 512 may be rotatably coupled to the support part 100, and in particular may be fixed to the insertion parts 120. The first wire 610 or the second wire 620 may extend if they are wound on the first connection pulley 411 or 511 and the second connection pulley 412 or 512.

In one embodiment, one end of the first fixing unit 410 or the second fixing unit 510 is slidable with respect to the support unit 100 if the end of the first fixing unit 410 or the second fixing unit 510 is inserted into the support unit 100. A rotary shaft of the second connection pulley 412 or 512 may pass through the first fixing unit 410 or the second fixing unit 510 and be coupled to the support unit 100. A sliding groove 413, through which the rotary shaft of the second connection pulley 412 or 512 passes to be slidable, may be formed in the first fixing unit 410 or the second fixing unit 510.

Therefore, the second connection pulley 412 or 512 may be slid along the sliding groove 413 of the first fixing unit 410 or the second fixing unit 510 under the condition that the rotary shaft of the second connection pulley 412 or 512 is fixed to the support unit 100. The separation distance between the second connection pulley 412 or 512 and the first connection pulley 411 or 511 may vary depending on sliding of the first fixing unit 410 or the second fixing unit 510 with respect to the support unit 100.

In other words, even when the wearable apparatus is adjusted to be pressed against the body of the wearer, the operation force of the power transmission unit 600 may remain the same.

A binder 420 or 520, which couples the first rotating unit 400 or the second rotating unit 500 to the thigh of the wearer, may be provided on the first rotating unit 400 or the second rotating unit 500 to transmit rotational force of the first rotating unit 400 or the second rotating unit 500 to the thigh of the wearer.

Particularly, considering that assistance to an action of stretching the waist of the wearer, i.e., an extension, is relatively more important, the binder 420 or 520 may be located in front of the thigh of the wearer and be configured to press the thigh of the wearer backwards when tension is applied to the second wire 620. Further, the binder 420 or 520 may be coupled to the thigh of the wearer by a harness or the like.

Figure 7:
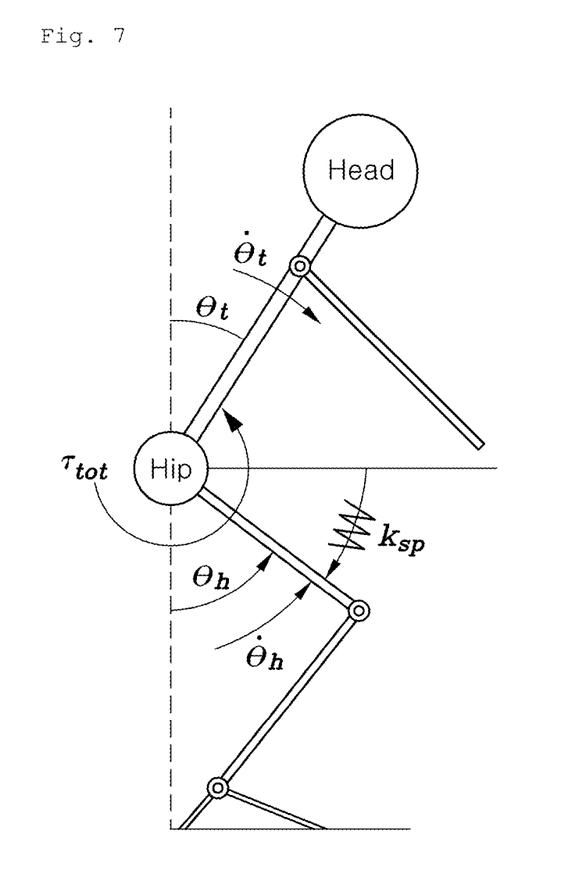
FIG. 7 is a schematic view illustrating a wearer wearing the wearable apparatus for assisting muscular strength in accordance with one embodiment of the present disclosure.

FIG. 7 is a schematic view that illustrates a wearer wearing the wearable apparatus for assisting muscular strength in accordance with one embodiment of the present disclosure.

Referring to FIG. 7, a method for controlling the wearable apparatus for assisting muscular strength in accordance with one embodiment of the present disclosure may include: calculating a torque demanded by the first rotating unit 400 and the second rotating unit 500; and controlling the actuator 200 based on the calculated torque and a force transmitted by the power transmission unit 600.

In this example, the method for controlling the wearable apparatus for assisting muscular strength in accordance with one embodiment of the present disclosure may be performed by the controller (not shown) loaded in the support unit. The controller (not shown) in accordance with one embodiment of the present disclosure may be implemented through a non-volatile memory (not shown) configured to store data pertaining to an algorithm configured to control operations of various elements or software instructions to implement the algorithm and a processor (not shown) to perform operations, which are described below, using the data stored in the corresponding memory. In this example, the memory and the processor may be implemented as separate chips. Alternatively, the memory and the processor may be implemented as a single integrated chip. In this example, one or more processors may be provided.

In more detail, in the calculation of the demanded torque, the demanded torque $\tau_{tot}$ may be calculated as the sum of a gravity compensation torque $\tau_{GT}$ which compensates for gravity due to bending of the torso of the wearer, a virtual elastic torque $\tau_{SH}$ which is applied to a virtual spring due to bending of the thighs of the wearer, a torso assisting torque $\tau_{NT}$ which assists a torso extension action of the wearer, and a thigh assisting torque $\tau_{NH}$ which assists a thigh extension action of the wearer.

In other words, the demanded torque $\tau_{tot}$ may be calculated through the following Equation (1).

$$\tau_{tot} = \tau_{GT} + \tau_{NT} + \tau_{SH} + \tau_{NH} \tag{1}$$

Specifically, the gravity compensation torque $\tau_{GT}$ may be calculated based on an angle of bending of the torso of the wearer. If the angle of bending of the torso of the wearer has a negative value, the angle of bending of the torso of the wearer may be multiplied by a predetermined gain value $G_{amp}$.

The gravity compensation torque $\tau_{GT}$, which is a torque to compensate for gravity due to bending of the torso of the wearer, may be calculated using the following Equation (2) based on the angle of bending of the torso of the wearer $\theta_t$. Particularly, if the angle of bending of the torso of the wearer $\theta_t$ has a negative value, this posture corresponds to a posture in which the waist of the wearer is bent backwards, and thus the torque $\tau_{Gt}$ may be amplified so as to compensate for the angle of bending of the torso of the wearer $\theta_t$.

$$\tau_{GT} = \begin{cases} L_{tor} m_{tor} g \sin\theta_t, & \theta_t > 0. \\ G_{amp} L_{tor} m_{tor} g \sin\theta_t, & \text{otherwise} \end{cases} \tag{2}$$

Here, $L_{tot}$ is a distance from a center of gravity of the wearer or a center of rotation of the torso of the wearer to a center of gravity of the torso of the wearer, $m_{tor}$ is a mass of the torso of the wearer, g is an acceleration due to gravity, and $G_{amp}$ is the predetermined gain value.

Further, the virtual elastic torque $\tau_{SH}$ may be calculated based on an angle of bending of the thighs of the wearer $\theta_h$ and a predetermined virtual spring constant $k_{sp}$. Particularly, the virtual elastic torque $\tau_{SH}$ may be calculated using the following Equation (3), on the assumption that there is a virtual spring between the thighs and the torso of the wearer.

$$\tau_{SH} = k_{sp} \theta_h \tag{3}$$

Here, the angle of bending of the thighs of the wearer $\theta_h$ may be calculated as an average value of respective angles of bending of both thighs of the wearer as shown in Equation (4) below.

$$\theta_h = \frac{\theta_{RH} + \theta_{LH}}{2} \tag{4}$$

The torso assisting torque $\tau_{NT}$ or the thigh assisting torque $\tau_{NH}$ may be calculated based on an angular speed of the torso extension action or the thigh extension action of the wearer. Particularly, the torso assisting torque $\tau_{NT}$ or the thigh assisting torque $\tau_{NH}$ may be force assisting the movement of the torso or the thighs of the wearer, and be calculated using the following Equation (5).

$$\tau_{NT} = \begin{cases} k_{td} \tilde{f}_{tv} \dot\theta_t, & \text{if } \dot\theta_t < 0. \\ 0, & \text{otherwise} \end{cases}$$

$$\tau_{NH} = \begin{cases} k_{hd} \tilde{f}_{hv} \dot\theta_h, & \text{if } \dot\theta_h < 0. \\ 0, & \text{otherwise} \end{cases} \tag{5}$$

Here, $k_{td}$ and $k_{hd}$ may be predetermined weighting factors, and $\tilde{f}_{tv}$ and $\tilde{f}_{hv}$ may be calculated using the following functions (6) which are varied depending on the angle of bending of the torso of the wearer $\theta_t$ and the angle of bending of the thighs of the wearer $\theta_h$.

$$\tilde{f}_{tv} \text{ or } \tilde{f}_{hv} = \begin{cases} 1, & \text{if } \theta_t > \frac{\pi}{4}. \\ \sin(2\theta_t) \text{ or } \sin(2\theta_h), & \text{otherwise} \end{cases} \tag{6}$$

The torso assisting torque $\tau_{NT}$ or the thigh assisting torque $\tau_{NH}$ may be calculated such that a magnitude thereof is decreased as the angle of bending of the torso of the wearer $\theta_t$ or the angle of bending of the thighs of the wearer $\theta_h$ is decreased, if the angle of the bending of the torso of the wearer $\theta_t$ or the angle of bending of the thighs of the wearer $\theta_h$ is a predetermined angle or less.

Particularly, the torso assisting torque $\tau_{NT}$ or the thigh assisting torque $\tau_{NH}$ may be set to be decreased close to 0, when the angle of bending of the torso of the wearer $\theta_t$ or the angle of bending of the thighs of the wearer $\theta_h$ is decreased to the predetermined angle or less. Further, the torso assisting torque $\tau_{NT}$ or the thigh assisting torque $\tau_{NH}$ may be maintained at a designated value, if the angle of bending of the torso of the wearer $\theta_t$ or the angle of bending of the thighs of the wearer $\theta_h$ exceeds the predetermined angle.

The elastic bodies 630, which are located between each end of the power transmission unit 600 and the first rotating unit 400 or the second rotating unit 500 and are deformed by force transmitted by the power transmission unit 600, are provided on the power transmission unit 600. In the control of the actuator 200, the force transmitted by the power transmission unit 600 may be estimated based on deformation of the elastic bodies 630.

In accordance with one embodiment, in the control of the actuator 200, force $F_d$ demanded by the power transmission unit 600 may be calculated based on the calculated demanded torque using the following Equation (7).

$$\vec\tau = \vec R \times \vec F \tag{7}$$

Further, force F, which acts on the power transmission unit 600, may be calculated based on a deformation $\Delta x$ of the elastic bodies 630 and an elastic constant k of the elastic bodies 630, as shown in Equation (8) below.

$$\vec F = k \Delta x \tag{8}$$

Particularly, using the force $F_d$ demanded by the power transmission unit 600 and the force F, which acts on the power transmission unit 600, the actuator 20 may be controlled through indirect force control, as shown in Equation (9) below.

$$F=F_d+K_p(F_d-F)+K_d(\dot{F}_d-\dot{F}) \qquad (9)$$

Here, $K_p$ is a p gain, and $K_d$ is a d gain.

In accordance with one embodiment, if the actuator 200 is a motor, an amplitude of current supplied to the motor may be calculated, as shown in Equation (10) below.

$$I_{cur} = \frac{F_d}{Gk_I} + K_p\left(\frac{F_d}{Gk_I} - \frac{k_s\Delta x}{Gk_I}\right) + K_d\left(\frac{\dot{F}_d}{Gk_I} - \frac{k_s\Delta \dot{x}}{Gk_I}\right)$$

Here, $k_1$ is a motor constant, and $k_s$ is an elastic constant.

As is apparent from the above description, a wearable apparatus for assisting muscular strength in accordance with one embodiment of the present disclosure drives the posture of a wearer using only one actuator. Thus, the cost of manufacturing the wearable apparatus may be reduced, and a power transmission unit may interlock rotations of a first rotating unit and a second rotating unit with each other to avoid interfering with walking of the wearer.

Further, even if a sideways separation distance is adjusted so that the wearable apparatus for assisting muscular strength may be pressed against the body of the wearer, operation force of the power transmission unit may remain the same.

Moreover, in a method for controlling the wearable apparatus for assisting muscular strength in accordance with one embodiment of the present disclosure, magnitudes of tension applied to a first wire and a second wire are estimated by measuring deformation of elastic bodies, and thereby, the actuator may be controlled.

Although various embodiments of the present disclosure have been disclosed for illustrative purposes, a person having ordinary skill in the art should appreciate that various modifications, additions and substitutions are possible, without departing from the scope and spirit of the disclosure as disclosed in the accompanying claims.

What is claimed is:

1. A wearable apparatus for assisting muscular strength, the wearable apparatus comprising:
    a support unit located on a rear surface of a wearer;
    an actuator located on the support unit so as to be fixed thereto;
    a sliding unit slidably connected to the actuator and being slidable with respect to the support unit due to driving of the actuator;
    a first rotating unit and a second rotating unit connected to the support unit to be located at both sides of the wearer such that one end of each of the first and second rotating units is coupled to the support unit so as to be rotatable forwards and backwards with respect to the support unit; and
    a power transmission unit provided with respective ends coupled to the first rotating unit and the second rotating unit via the sliding unit and configured to generate rotary force of the first rotating unit and the second rotating unit due to sliding of the sliding unit,
    wherein the power transmission unit comprises
        a first wire disposed via the sliding unit and provided with respective ends coupled to the first rotating unit and the second rotating unit to rotate the first rotating unit and the second rotating unit forwards when tension is applied thereto, wherein the first wire is configured to slide against the sliding unit, and
        a second wire disposed via the sliding unit and provided with respective ends coupled to the first rotating unit and the second rotating unit to rotate the first rotating unit and the second rotating unit backwards when tension is applied thereto, wherein the second wire is configured to slide against the sliding unit, and
    wherein the first wire and the second wire are arranged to be spaced apart from each other along the sliding unit.

2. The wearable apparatus according to claim 1, wherein the ends of the first wire are coupled to front parts of the first rotating unit and the second rotating unit, and the ends of the second wire are coupled to rear parts of the first rotating unit and the second rotating unit.

3. The wearable apparatus according to claim 1, wherein elastic bodies located between the respective ends of the power transmission unit and each of the first rotating unit and second rotating unit and deformed by tension transmitted by the power transmission unit are provided on the power transmission unit.

4. The wearable apparatus according to claim 1, wherein the power transmission unit extends to both ends of the wearable apparatus when the power transmission unit is wound on one side of the support unit and the sliding unit, spaced sideways apart from the sliding unit.

5. The wearable apparatus according to claim 4, wherein:
    a first stationary pulley is provided at the one side of the support unit, spaced sideways apart from the sliding unit, and a first movable pulley is provided at the sliding unit; and
    the power transmission unit is wound on the first stationary pulley and the first movable pulley between the respective ends of the power transmission unit.

6. The wearable apparatus according to claim 5, wherein:
    the power transmission unit comprises a first wire and a second wire;
    the first wire is wound on the first stationary pulley and the first movable pulley between respective ends of the first wire; and
    the second wire is wound on a second stationary pulley rotatably coupled to the other side of the support unit, spaced sideways apart from the sliding unit, and a second movable pulley rotatably coupled to the sliding unit.

7. The wearable apparatus according to claim 1, further comprising:
    a first fixing unit and a second fixing unit, each of which is provided with one end coupled to each of both sides of the support unit and the other end rotatably coupled to each of the first rotating unit and the second rotating unit.

8. The wearable apparatus according to claim 7, wherein the one end of each of the first fixing unit and the second fixing unit is coupled to the support unit to be slidable sideways.

9. The wearable apparatus according to claim 8, wherein:
    a first connection pulley rotatably coupled to each of the first fixing unit and the second fixing unit is provided at one end of each of the first fixing unit and the second fixing unit;
    a second connection pulley rotatably coupled to the support unit is provided at a position of the support unit spaced outwards from the first connection pulley; and the power transmission unit is wound on the first connection pulley and the second connection pulley between the respective ends of the power transmission unit.

10. The wearable apparatus according to claim 9, wherein:
   one end of each of the first fixing unit and the second fixing unit is slidable with respect to the support unit in a state in which the one end is inserted into the support unit; and
   a rotary shaft of the second connection pulley passes each of the first fixing unit and the second fixing unit and is coupled to the support unit, wherein a sliding groove, through which a rotary shaft of the second connection pulley passes so as to be slidable, is formed in each of the first fixing unit and the second fixing unit.

11. The wearable apparatus according to claim 1, wherein a binder configured to couple each of the first rotating unit and the second rotating unit to a thigh of the wearer is provided on each of the first rotating unit and the second rotating unit so as to transmit rotational force of each of the first rotating unit and the second rotating unit to the thigh of the wearer.

12. A method for controlling the wearable apparatus according to claim 1, the method comprising:
   calculating a torque demanded by the first rotating unit and the second rotating unit; and
   controlling the actuator based on the calculated torque and a force transmitted by the power transmission unit.

13. The method according to claim 12, wherein, in the calculating the demanded torque, the demanded torque is calculated as a sum of a gravity compensation torque configured to compensate for gravity due to bending of a torso of the wearer, a virtual elastic torque configured to be applied to a virtual spring due to bending of thighs of the wearer, a torso assisting torque configured to assist a torso extension action of the wearer, and a thigh assisting torque configured to assist a thigh extension action of the wearer.

14. The method according to claim 13, wherein the gravity compensation torque is calculated based on an angle of bending of the torso of the wearer, and if the angle of bending of the torso of the wearer has a negative value, the angle of bending of the torso of the wearer is multiplied by a predetermined gain value.

15. The method according to claim 13, wherein the virtual elastic torque is calculated based on an angle of bending of the thighs of the wearer and a predetermined virtual spring constant.

16. The method according to claim 13, wherein each of the torso assisting torque and the thigh assisting torque is calculated based on a corresponding of an angular speed of a corresponding one of the torso extension action and the thigh extension action of the wearer.

17. The method according to claim 16, wherein each of the torso assisting torque and the thigh assisting torque is calculated such that a magnitude thereof is decreased, as a corresponding one of the angle of bending of the torso of the wearer and the angle of bending of the thighs of the wearer is decreased, as long as the corresponding one of the angle of bending of the torso of the wearer and the angle of bending of the thighs of the wearer is a predetermined angle or less.

18. The method according to claim 12, wherein elastic bodies located between the respective ends of the power transmission unit and each of the first rotating unit and the second rotating unit and deformed by tension transmitted by the power transmission unit are provided on the power transmission unit; and
   in the controlling the actuator, the force transmitted by the power transmission unit is estimated based on deformation of the elastic bodies.

* * * * *